(12) United States Patent
Hafner et al.

(10) Patent No.: US 11,724,969 B2
(45) Date of Patent: Aug. 15, 2023

(54) COATING FOR IMPROVED SURFACE FINISH

(71) Applicant: General Electric Company, Schenectady, NY (US)

(72) Inventors: Matthew Troy Hafner, Honea Path, SC (US); John McConnell Delvaux, Fountain Inn, SC (US); Jason Robert Parolini, Greer, SC (US); Rajendra Kumar Bordia, Seneca, SC (US); Quan Li, Central, SC (US)

(73) Assignee: General Electric Company, Schenectady, NY (US)

( * ) Notice: Subject to any disclaimer, the term of this patent is extended or adjusted under 35 U.S.C. 154(b) by 1279 days.

(21) Appl. No.: 16/220,822

(22) Filed: Dec. 14, 2018

(65) Prior Publication Data
US 2020/0189985 A1 Jun. 18, 2020

(51) Int. Cl.
*C04B 41/45* (2006.01)
*C04B 41/50* (2006.01)
*F01D 5/28* (2006.01)

(52) U.S. Cl.
CPC ...... *C04B 41/4584* (2013.01); *C04B 41/4543* (2013.01); *C04B 41/4545* (2013.01); *C04B 41/5031* (2013.01); *C04B 41/5035* (2013.01); *C04B 41/5045* (2013.01); *F01D 5/282* (2013.01); *F05D 2240/11* (2013.01); *F05D 2300/603* (2013.01); *F05D 2300/6033* (2013.01); *F05D 2300/611* (2013.01)

(58) Field of Classification Search
CPC ..... C04B 2103/0011; C04B 2103/0021; C04B 35/80; C04B 41/009; C04B 41/4543; C04B 41/4545; C04B 41/4584; C04B 41/5006; C04B 41/5024; C04B 41/5031; C04B 41/5035; C04B 41/5045; C04B 41/5059; C04B 41/87; F01D 5/282; F01D 5/284; F01D 5/288; F05D 2240/11; F05D 2300/21; F05D 2300/211; F05D 2300/2112; F05D 2300/50212; F05D 2300/603; F05D 2300/6033; F05D 2300/611
See application file for complete search history.

(56) References Cited

U.S. PATENT DOCUMENTS

| | | | |
|---|---|---|---|
| 7,968,217 B2 * | 6/2011 | Sarrafi-Nour | C04B 41/89 428/432 |
| 8,021,762 B2 * | 9/2011 | Taylor | C23C 4/02 428/685 |
| 8,846,218 B2 * | 9/2014 | Bouillon | C04B 41/86 501/55 |
| 9,238,595 B2 | 1/2016 | Bouillon et al. | |
| 9,404,185 B2 | 8/2016 | Bouillon et al. | |
| 2005/0031794 A1 * | 2/2005 | Darolia | C23C 10/06 427/523 |
| 2006/0280955 A1 * | 12/2006 | Spitsberg | C23C 4/18 427/446 |

(Continued)

*Primary Examiner* — Jesse S Bogue
(74) *Attorney, Agent, or Firm* — James Pemrick; Charlotte Wilson; Hoffman Warnick LLC

(57) ABSTRACT

A ceramic matrix composite (CMC) component includes at least one seal surface, the at least one seal surface disposed adjacent an interfacing surface for providing a seal therebetween; and a coating disposed on the seal surface. The coating includes an aluminum oxide and/or a silicon dioxide.

22 Claims, 5 Drawing Sheets

(56) References Cited

U.S. PATENT DOCUMENTS

| | | | |
|---|---|---|---|
| 2007/0077141 A1* | 4/2007 | Keller | F01D 11/08 |
| | | | 415/136 |
| 2014/0110903 A1* | 4/2014 | Trompenaars | C23C 16/40 |
| | | | 277/312 |
| 2018/0311934 A1* | 11/2018 | Shoemaker | B32B 3/30 |
| 2019/0375689 A1* | 12/2019 | Saha | F01D 5/005 |

* cited by examiner

| Materials System | Composition | Processing Temperature (°C) | CTE (X 10^-6/(°C)) | Softening point (/°C) |
|---|---|---|---|---|
| BAS | S:B:A=33: 61.5: 5.5 | 1300 | 12.4 | >1200 |
| BAS | S:B:A=40.3: 51.3: 8.4 | 1300 | 8.9 | 815 |
| BAS | S:B:A=66.7: 20: 13.3 | 1400 | 4.3 | 978 |
| BAS | S:B:A=75: 11.7: 13.3 | 1300 | - | 973 |
| BAS-SiC | BAS: SiC=98: 2 | 1400 | 4.5 | 989 |
| BAS-SiC | BAS: SiC=80: 20 | 1400 | 3.9 | 1003 |
| BAS-SiC | BAS: SiC=65: 35 | 1400 | 4.0 | 1103 |
| SAY | S:A:Y= 54: 18.07: 27.93 | 1300 | 4.7 | >1200 |
| SAY | S:A:Y= 54: 18.07: 27.93 | 1350 | 5.4 | >1200 |
| SAY | S:A:Y= 54: 18.07: 27.93 | 1400 | 4.8 | >1200 |
| SAY-B2O3 | SAY:B2O3= 97: 3 | 1400 | 4.2 | >1200 |
| SAY-B2O3 | SAY:B2O3= 95: 5 | 1300 | 5.0 | >1200 |
| SAY-B2O3 | SAY:B2O3= 95: 5 | 1350 | 4.6 | >1200 |
| SAY-B2O3 | SAY:B2O3= 95: 5 | 1400 | 4.5 | >1200 |
| SAY-B2O3 | SAY:B2O3= 90: 10 | 1400 | 3.7 | 852 |
| SAY-B2O3 | SAY:B2O3= 85: 15 | 1400 | 4.6 | 856 |
| SAY-BAS | SAY:BAS= 90: 10 | 1300 | 5.7 | >1200 |
| SAY-BAS | SAY:BAS= 90: 10 | 1350 | 4.8 | >1200 |
| SAY-BAS | SAY:BAS= 90: 10 | 1400 | 4.3 | >1200 |
| SAY-BAS | SAY:BAS= 80: 20 | 1300 | 5.2 | >1200 |
| SAY-BAS | SAY:BAS= 80: 20 | 1350 | 5.0 | >1200 |
| SAY-BAS | SAY:BAS= 80: 20 | 1400 | 5.0 | 935 |
| SAY-BAS | SAY:BAS= 70: 30 | 1300 | 5.2 | >1200 |
| SAY-BAS | SAY:BAS= 70: 30 | 1350 | 4.7 | >1200 |
| SAY-BAS | SAY:BAS= 70: 30 | 1400 | 4.8 | 938 |

FIG. 3

| Materials System | Composition | Processing Temperature (°C) | CTE (X 10^-6/(°C)) | Softening point (/°C) | Coating Roughness | |
|---|---|---|---|---|---|---|
| SAY | S:A:Y= 54: 18.07: 27.93 | 1350 | 5.4 | >1200 | Rough | 318 |
| SAY | S:A:Y= 54: 18.07: 27.93 | 1400 | 4.8 | >1200 | Rough | 320 |
| SAY-B2O3 | SAY:B2O3= 95: 5 | 1400 | 4.5 | >1200 | Rough | 328 |
| SAY-BAS | SAY:BAS= 90: 10 | 1400 | 4.3 | >1200 | Rough | 338 |
| SAY-BAS | SAY:BAS= 80: 20 | 1350 | 5.0 | >1200 | Smooth | 342 |
| SAY-BAS | SAY:BAS= 70: 30 | 1300 | 5.2 | >1200 | Rough | 346 |
| SAY-BAS | SAY:BAS= 70: 30 | 1350 | 4.7 | >1200 | Smooth | 348 |

FIG. 4

COATING FOR IMPROVED SURFACE FINISH

STATEMENT OF GOVERNMENT RIGHTS

The invention described in the present disclosure was made with the support of the U.S. Government under contract number DE-FE0024006, which was awarded by the Department of Energy. The U.S. Government has certain rights in this invention.

BACKGROUND

The present subject matter relates generally to coatings, and more specifically to coatings for gas turbine engines.

As the demand for more efficient gas turbine engines drives internal operating temperatures higher, the transition to higher temperature materials has driven the transition from metallic nickel-based superalloys to ceramic matrix composites (CMC), which offer both mechanical strength as well as resistance to high temperatures. However, CMCs may have higher production costs and/or longer manufacturing cycle times compared to metallic nickel-based superalloys. In addition, the geometries and/or topologies in which CMC components can be formed may be limited compared to metallic nickel-based superalloys.

The orthotropic nature of CMCs can lead to porosity and inconsistent machined surface finish. Porosity in a CMC sealing surfaces (i.e., in applications where CMCs are installed within or proximate gas turbine hot gas paths (HGP)) may allow cooling flow leakage past the seals, thereby resulting in efficiency losses. In addition, inconsistent machining, due to, for example varying speeds of material removal of ceramic matrices and/or fibers, can lead to ripples or rough surfaces in finished CMC components. Rough surfaces may create undulations and gaps between the CMC seals and sealing surfaces for cooling flow to leak through, again leading to efficiency losses in gas turbine engines.

BRIEF DESCRIPTION OF THE EMBODIMENTS

Aspects of the present embodiments are summarized below. These embodiments are not intended to limit the scope of the present claimed embodiments, but rather, these embodiments are intended only to provide a brief summary of possible forms of the embodiments. Furthermore, the embodiments may encompass a variety of forms that may be similar to or different from the embodiments set forth below, commensurate with the scope of the claims.

In one aspect, a ceramic matrix composite (CMC) component includes at least one seal surface, the at least one seal surface disposed adjacent an interfacing surface for providing a seal therebetween; and a coating disposed on the seal surface. The coating includes an aluminum oxide and/or a silicon dioxide.

In another aspect, a gas turbine includes a compressor section; a combustor section fluidly coupled downstream of the compressor section; a turbine section fluidly coupled downstream of the combustor section; and a ceramic matrix composite (CMC) component. The CMC component includes at least one seal surface disposed adjacent an interfacing surface for providing a seal therebetween, and a coating disposed on the seal surface. The coating includes an aluminum oxide and/or a silicon dioxide.

In another aspect, a method of forming a coated ceramic matrix composite (CMC) component includes providing a CMC component; performing at least one of grinding the CMC component and electro discharge machining (EDM) the CMC component; and depositing a coating on the CMC component. The coating includes aluminum oxide and/or silicon dioxide.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 is summary of coating composition test points;

FIG. 4 is summary of coating composition that were selected for further study.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "axial" refers to a direction aligned with a central axis or shaft of a gas turbine.

As used herein, the term "circumferential" refers to a direction or directions around (and tangential to) the outer circumference of the gas turbine, or for example the circle defined by the swept area of the rotor of the gas turbine. As used herein, the terms "circumferential" and "tangential" may be synonymous.

As used herein, the term "radial" refers to a direction moving outwardly away from the central axis of the gas turbine. A "radially inward" direction is aligned toward the central axis moving toward decreasing radii. A "radially outward" direction is aligned away from the central axis moving toward increasing radii.

Figure 1:
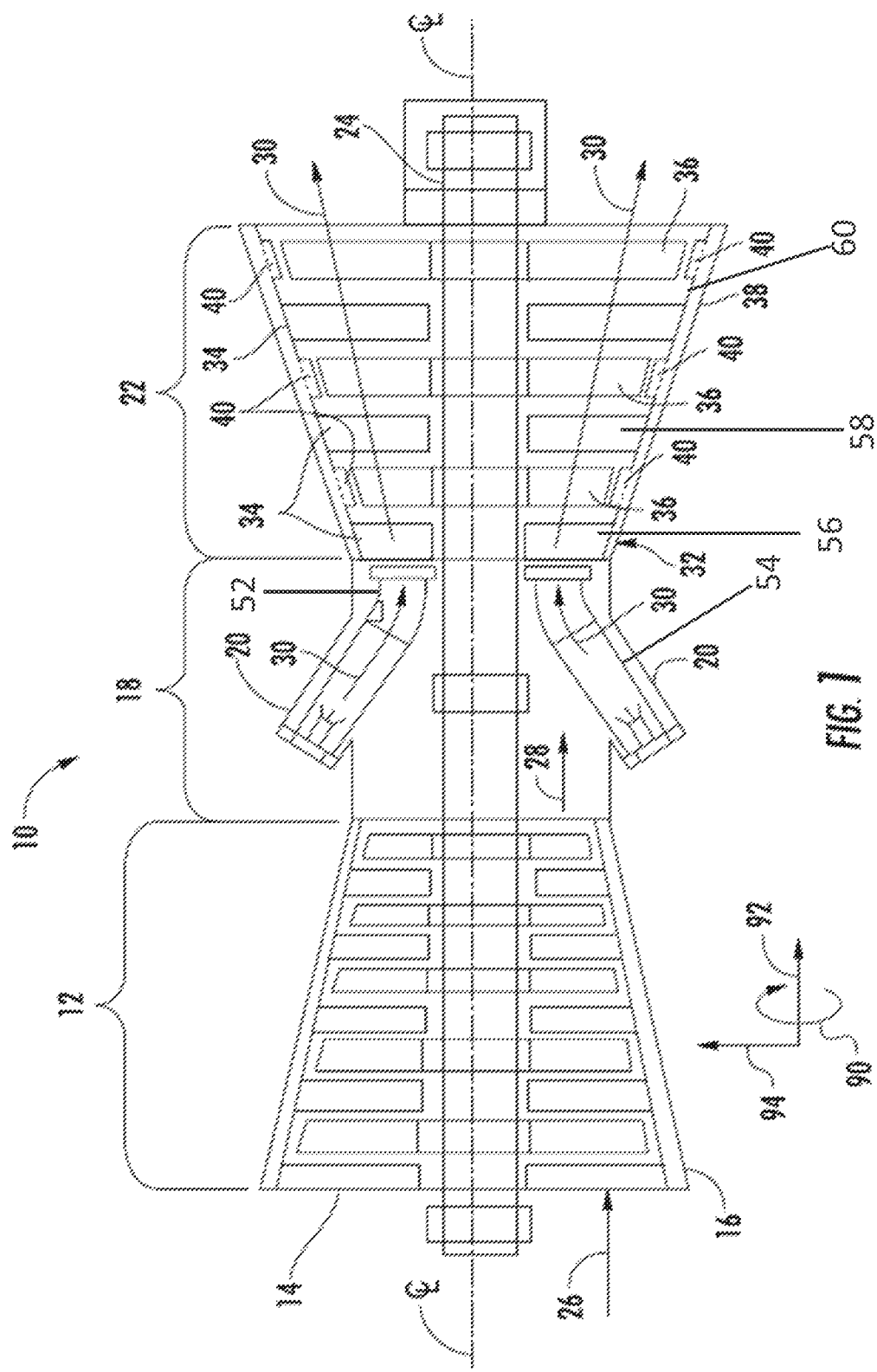
FIG. 1 is a side schematic representation of a gas turbine engine.

Referring now to the drawings, wherein like numerals refer to like components, FIG. 1 illustrates an example of a gas turbine 10 which may incorporate various aspects of the embodiments disclosed herein. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having at least one combustor 20 downstream from the compressor section 12, and a turbine section 22 downstream from the combustion section 18. As shown, the combustion section 18 may include a plurality of the combustors 20. A shaft 24 extends axially through the gas turbine 10. FIG. 1 illustrates the radial 94, axial 92 and circumferential directions 90.

Referring still to FIG. 1, the gas turbine 10 may include a transition piece 52 disposed between a downstream end of the combustor 20 and an upstream end of the turbine section 22. The combustor 20 may include a combustor liner 54 defining the boundaries of the combustor 20. The combustion section 18 may include a plurality of substantially cylindrical "can-style" combustors 20 circumferentially spaced around the gas turbine 10, in which case the combustor liners 54 may also be substantially cylindrical. In other embodiments, the combustion section 18 may include an annular combustor 20, in which case the combustor liner 54 may include both an inner liner (not shown) defining a radially inner boundary of the annular combustor 20, as well as an outer liner (not shown) defining a radially outer boundary of the annular combustor 20. The gas turbine 10 may also include a stage one nozzle 56 located in the turbine section 22 and disposed axially aft of the transition piece 52, as well as a second stage nozzle 58 disposed downstream of a first stage turbine rotor 36. The gas turbine 10 may also include one or more flow path ducts 60 defining a radially outer boundary of a turbine gas path at axial locations between rotors and stators (i.e., blades 36 and nozzles 34). A gas turbine "hot section" may include both the combustor section 18 and components thereof, as well as the turbine section 22 and components thereof.

In operation, air 26 is drawn into the inlet 14 of the compressor section 12 and is progressively compressed to provide compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. The rotor shaft 24 rotates about an engine centerline CL. A turbine casing 38 at least partially encases the rotor blades 36 and the turbine nozzles 34. Each or some of the rows of rotor blades 36 may be concentrically surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition, or in the alternative, the shaft 24 may be used to drive the compressor section 12 of the gas turbine.

Figure 2:
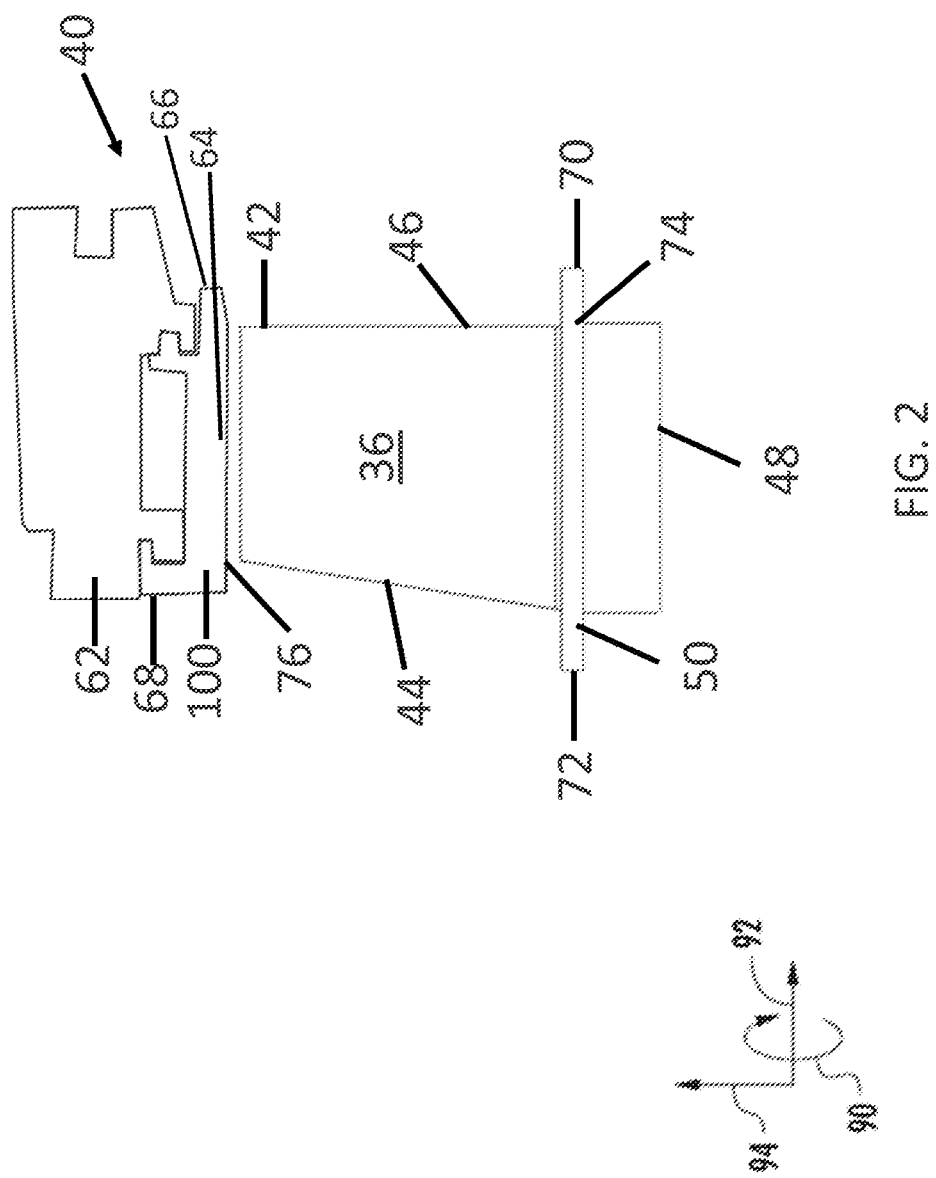
FIG. 2 is a side schematic representation of a turbine airfoil.

FIG. 2 illustrates an enlarged side view of a portion of the turbine section 22 including an exemplary rotor blade 36 and a portion of a shroud block assembly 40 according to various embodiments of the present disclosure. The turbine rotor blade or airfoil 36, extends from an axially forward leading edge 44 to an axially aft trailing edge 46, and from a radially inward root 48 to a radially outer tip 42. The airfoil 36 includes a platform 50 defining a radially inner boundary of a hot gas path. As shown in FIG. 2, the shroud block assembly 40 generally extends in a radial direction 94 outward from the airfoil 36 between the turbine casing 38 (not shown) and a tip portion 42 of the rotor blade 36. The shroud block assembly 40 generally includes mounting hardware 62 for securing a plurality of shroud block segments 100 to the shroud block assembly 40. The plurality of shroud block segments 100 may be arranged circumferentially 90 in an annular array around the rotor blades 36 within the turbine casing 38 (not shown).

Still referring to FIG. 2, each shroud block segment 100 may include a slash face 64 forming a circumferential interface with an adjacent shroud block segment 100. Stated otherwise, the plurality of shroud block segments 100 may be arranged circumferentially 90, and the slash face 64 of each shroud block segment 100 may contact and/or be adjacent to the slash face 64 of an adjacent shroud block segment 100. Each shroud block segment 100 may also include a shroud segment forward edge 68, a shroud segment aft edge 66, and a shroud hot gas surface 76. The shroud segment forward edge 68 and the shroud segment aft edge 66 are located on the axially forward and aft ends respectively of each shroud block segment 100, while the shroud hot gas surface 76 is disposed at a radially inward surface of each shroud block segment 100 and forms the radially outer boundary of the turbine hot gas path. The platform 50 may also include a platform forward edge 72, a platform aft edge 70, and a platform circumferential edge 74 disposed at the axially forward, axially aft and circumferential ends, respectively, of each platform 50. Coatings of the embodiments disclosed herein may be disposed at one or more of the transition piece 52, the combustor liners 54, the first stage nozzle 56, the second stage nozzle 58, other turbine nozzles 34, flow-path ducts 60, the slash face 64, the shroud segment forward edge 68, the shroud segment aft edge 66, the shroud hot gas surface 76, the platform forward edge 72, the platform aft edge 70, the platform circumferential edge 74, as well as on other seal surfaces of CMC components.

FIGS. 3 and 4 summarize a series of test points that were undertaken to quantify various material properties of the coatings of the embodiments disclosed herein. In each case, a coating with a thickness between about 0.01 inches and about 0.07 inches was applied to a crucible using various methods. In one or more cases, a coating with a thickness between about 0.02 inches and about 0.05 inches was used. Any crucible with suitable temperature resistance and surface qualities may be used. For example, the crucible may include one or more graphite crucibles, ceramic rods with rounded edges, machined ceramic surfaces, and/or other suitable crucibles. The coating may be applied to the crucible via a tape, mold, air spray, manually brushed on, applied as a powder and subsequently crystallized, and/or via other suitable techniques. In addition, various modifications may be made to the application process to arrive at the desired coating thickness, density, etc. For example, the flow rate at which the coating is applied via an air spray application process may be adjusted. In addition, the rate at which the crucible is translated under the application equipment (and/or the rate at which the application equipment is moved over the crucible) may be adjusted. The height from which the coating is applied as well as the pressure at which the coating is applied may both also be adjusted.

FIG. 3 illustrates the processing temperatures 356 at which a number of material systems 352 including specific compositions 354 where tested, as well as the resulting coefficients of thermal expansion (CTE) 358 and softening points 360. Test points 302, 304, 306, and 308 were all performed on a B-A-S material system including compositions with various mass percentages of barium oxide (i.e., BaO and "B" in "B-A-S"), aluminum oxide (i.e., Al2O3 and "A" in "B-A-S") and silicon dioxide (i.e., SiO2 and "S" in "B-A-S"). For example, test point 302 includes 33 percent by mass silicon dioxide, 61.5 percent by mass barium oxide, and 5.5 percent by mass aluminum oxide, while test point 304 includes 40.3 percent by mass silicon dioxide, 51.3 percent by mass barium oxide, and 8.4 percent by mass aluminum oxide, as indicated by the composition percentages listed in the composition column 354 of FIG. 3. Test point 302, which was performed at a processing temperature 356 of 1300° C., resulted in a CTE 358 of 12.4 ($\times 10^{-6}$/(° C.) and a softening point 360 greater than 1200° C. Although test point 302 resulted in a favorable softening point 360 greater than 1200° C., the CTE 358 was higher than desirable. Test point 304, which was also performed at a processing temperature 356 of 1300° C. but on a different B-A-S composition than test point 302, resulted in a CTE 358 of 8.9 ($\times 10^{-6}$/(° C.) and a softening point 360 of 815° C. Thus, test point 304 resulted in neither a desired CTE 358 nor a desired softening point 360. Both test points 306 and 308, which were performed on various B-A-S compositions at 1400° C. and 1300° C. respectively resulted in favorable CTE 358 (i.e., equal to or below about 8.0 ($\times 10^{-6}$/(° C.))), but lower than desirable softening points 360. A CTE 358 was not quantified for test point 308.

Referring still to FIG. 3, test points 310, 312, and 314 were performed on a B-A-S/SiC material system including compositions by mass of B-A-S and SiC (silicon carbide) as shown in the composition column 354. The B-A-S material system that was used in each of test points 310, 312, and 314 included 66.7 percent by mass silicon dioxide, 20 percent by mass barium oxide, and 13.3 percent by mass aluminum oxide (i.e., the same B-A-S material system as test point 306). Test point 310 was performed on a composition of 98% B-A-S and 2% SiC while test point 312 was performed on a coating with a composition of 80% B-A-S and 20% SiC. Each of test points 310, 312, and 314 were performed at a processing temperature 356 of 1400° C. and resulted in favorable CTE 358 (i.e., equal to or below about 8.0 ($\times 10^{-6}$/(° C.))), but lower than desirable softening points 360. In addition, test points 312 and 314 resulted in porous coatings.

Still referring to FIG. 3, test points 316, 318, and 320 were each performed on a S-A-Y material system including 54 percent by mass silicon dioxide (i.e., SiO2 and "S" in "S-A-Y"), 18.07 percent by mass aluminum oxide (i.e., Al2O3 and "A" in "S-A-Y"), and 27.93 percent by mass yttrium oxide (i.e., Y2O3 and "Y" in "S-A-Y"). Test points 316, 318, and 320 were performed at processing temperatures 356 of 1300° C., 1350° C., and 1400° C., respectively and each resulted in favorable CTE 358 (i.e., equal to or below about 8.0 ($\times 10^{-6}$/(° C.))) and favorable softening points 360 (i.e., greater than 1200° C.). However, test point 316 resulted in a porous coating.

Referring still to FIG. 3, test points 322, 324, 326, 328, 330, and 332 were each performed on coating compositions include a mixture of S-A-Y and B2O3 material systems. The S-A-Y material system of each of test points 322, 324, 326, 328, 330, and 332 includes 54 percent by mass silicon dioxide (i.e., SiO2 and "S" in "SAY"), 18.07 percent by mass aluminum oxide (i.e., Al2O3 and "A" in "S-A-Y"), and 27.93 percent by mass yttrium oxide (i.e., Y2O3 and "Y" in "S-A-Y"), similar to the S-A-Y material system of test points 316, 318, and 320. Each of test points 322, 324, 326, 328, 330, and 332 also include boron oxide (i.e., B2O3). For example, test point 322 includes 97 percent by mass S-A-Y material and 3 percent by mass boron oxide while test points 324, 326, and 328 each include 95 percent by mass S-A-Y material and 5 percent by mass boron oxide. Each of test points 322, 324, 326, 328, 330, and 332 resulted in a favorable CTE 358 (i.e., equal to or below about 8.0 ($\times 10^{-6}$/(° C.))), but only test points 322, 324, 326, and 328 resulted in favorable softening points 360 (i.e., greater than 1200° C.). In addition, test points 322, 324, and 326 all resulted in porous coatings.

Still referring to FIG. 3, test points 334, 336, 338, 340, 342, 344, 346, 348, and 350 were each performed on coating compositions including a mixture of S-A-Y and B-A-S material systems, in different ratios and at different processing temperatures 356. Each of test points 334, 336, 338, 340, 342, 344, 346, 348, and 350 include a S-A-Y material system including 54 percent by mass silicon dioxide (i.e., SiO2 and "S" in "S-A-Y"), 18.07 percent by mass aluminum oxide (i.e., Al2O3 and "A" in "SAY"), and 27.93 percent by mass yttrium oxide (i.e., Y2O3 and "Y" in "S-A-Y"), similar to the S-A-Y material system of test points 316-332. Each of test points 334, 336, 338, 340, 342, 344, 346, 348, and 350 include a B-A-S material system including 66.7 percent by mass silicon dioxide, 20 percent by mass barium oxide, and 13.3 percent by mass aluminum oxide (i.e., the same B-A-S material system as test points 306, 310, 312, and 314). Each of test points 334, 336, 338, 340, 342, 344, 346, 348, and 350 resulted in a favorable CTE 358 (i.e., equal to or below about 8.0 ($\times 10^{-6}$/(° C.))). Test points 334, 336, 338, 340, 342, 346, and 348 (i.e., all but test points 344 and 350) resulted in favorable softening points 360 (i.e., greater than 1200° C.). In addition, test points 334, 336 and 340 resulted in porous coatings.

FIG. 4 illustrates a summary of each of the non-porous coatings that include favorable CTE 358 and softening temperatures 360 from FIG. 3. As such, the coatings resulting from test points 318, 320, 328, 338, 342, 346, and 348 are summarized included in FIG. 4. Coatings resulting from these seven test points were further studied to understand surface roughness. The coatings resulting from test points 318, 320, 328, 338, and 346 were found to have rough surfaces while the coatings resulting from test points 342 and 348 were found to have smooth surfaces. The surface finish was quantified in terms of roughness average, Ra, with units in micro-inches (inches×$10^{-6}$) Roughness Average, Ra is calculated as the average of a surface's measured microscopic peaks and valleys. Rough surfaces may include surfaces with a roughness average of above about 150 Ra, or from about 150 Ra to about 250 Ra. Smooth surfaces may include surfaces with a roughness average of below about 150 Ra, or below about 100 Ra. In other embodiments, smooth surfaces may include surfaces with a roughness average between about 10 Ra and about 80 Ra. In other embodiments, smooth surfaces may include surfaces with a roughness average between about 15 Ra and about 60 Ra. In other embodiments, smooth surfaces may include surfaces with a roughness average between about 20 Ra and about 50 Ra. In other embodiments, smooth surfaces may include surfaces with a roughness average between about 30 Ra and about 40 Ra. Smooth surfaces may include surfaces with a roughness average between about 10 Ra and about 150 Ra, and all sub-ranges therebetween.

The compositions of the material systems included in FIGS. 3 and 4 may vary around the exact constituents shown. For example, the S-A-Y composition including approximately 54% S, 18% A and 28% Y (i.e., test points 316, 318, and 320) may include tolerance bands of 2%, 3%, and even 5% around each of the constituents. For example, the S-A-Y composition may include from about 49% to about 59% S, from about 13% to about 23% A, and from about 23% to about 33% Y, assuming 5% tolerance bands. Similarly, the S-A-Y composition may include from about 51% to about 57% S, from about 15% to about 21% A, and from about 25% to about 31% Y, assuming 3% tolerance bands. Similarly, the S-A-Y composition may include from about 52% to about 56% S, from about 16% to about 20% A, and from about 26% to about 30% Y, assuming 2% tolerance bands. Therefore, for the test points that include a mix of S-A-Y and B-A-S material systems (i.e., test points 334-350) which includes as little as 70% of S-A-Y material system in the overall composition, the overall composition may include as little as 70% of the lower limits of each of the ranges resulting from 5% tolerance bands. For example, the S-A-Y:B-A-S material systems in a 70:30 ratio may include as little as about 34.3 percent by mass S (i.e. silicon dioxide), about 9.1 percent by mass aluminum oxide, and about 16.1 percent by mass yttrium oxide, when accounting for the constituents of the S-A-Y material system. When also accounting for the B-A-S material system, in a 90:10 SAY:B-A-S ratio, the silicon dioxide may increase from about 34.3 percent to about 40.5 percent (i.e., an addition of 6.2% of the overall composition due to the silicon dioxide in the B-A-S material system, while the aluminum oxide may increase from about 9.1 to about 9.9 percent (i.e., an addition of about 0.8% of the overall composition due to the aluminum oxide in the B-A-S material system).

The B-A-S material composition of test point 306 was repeated again for test points 310-314 and 334-350 due to the low CTE 358. This material composition included 66.7% S, 20% B, and 13.3% A. When surrounded by 5% tolerance bands, these percentages range from about 62% to about 72% S, about 15% to about 25% B, and about 8% to about 18% A. When surrounded by 3% tolerance bands, these percentages range from about 64% to about 70% S, about 17% to about 23% B, and about 10% to about 16% A. When surrounded by 2% tolerance bands, these percentages range from about 65% to about 79% S, about 18% to about 22% B, and about 11% to about 15% A.

Figure 5:
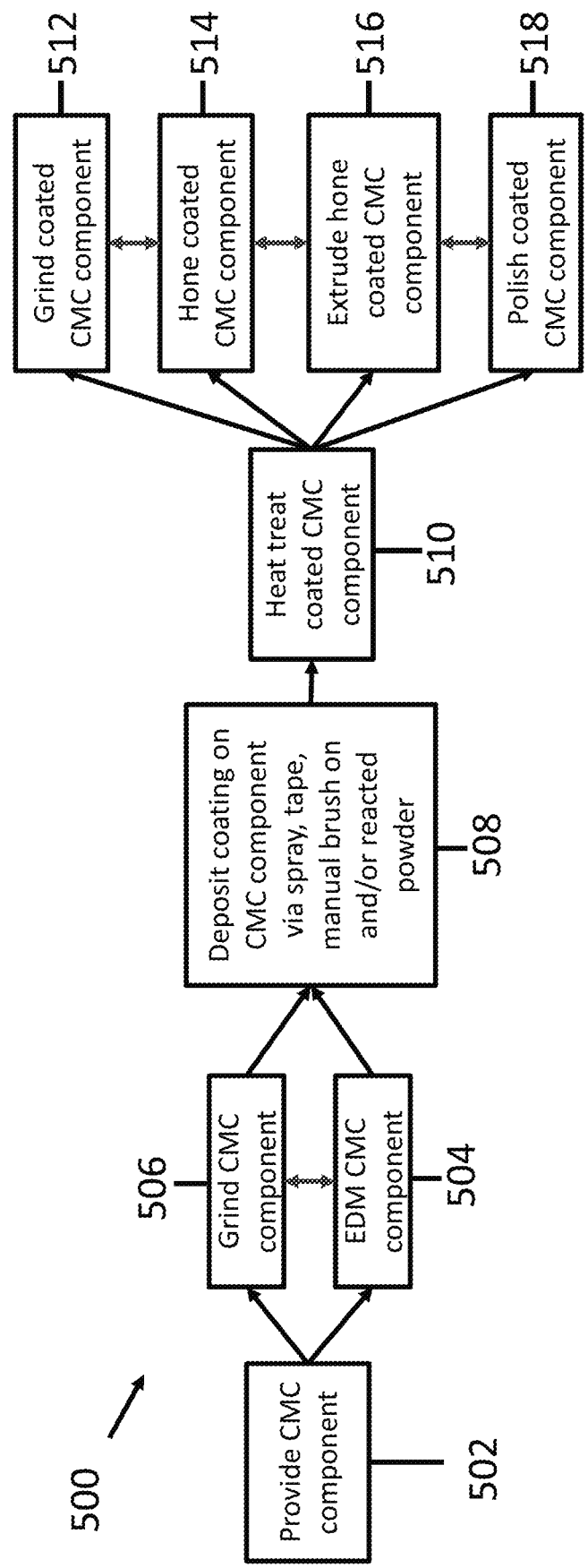
FIG. 5 is a method of forming a CMC component with a coating disposed thereon, according to aspects of the present embodiments.

FIG. 5 illustrates a method 500 of forming CMC components coating with coatings according to the embodiments disclosed herein. At step 502, the method includes providing a CMC component. The CMC component may include a finished CMC component, a CMC component that is in a green state, and/or a CMC component that has been solidified but that may require one or more post-processing steps such as heat treat and/or machining. At step 504, the method may include performing an EDM (electro discharge machining) process on the CMC component. At step 506, the method 500 may include performing a grinding process on the CMC component. Steps 504 and 506 may be performed in any order. In some embodiments, both steps 504 and 506 are performed. In some embodiments, neither step 504 nor step 506 is performed. In some embodiments, only one of steps 504 and 506 is performed. At step 508, the method 500 may include depositing a coating on the CMC component. The coating may be deposited on the CMC component via spray, plasma spray, and/or air spray, tape, manual brushing, and/or via powder which may be subsequently crystallized and/or reacted onto the CMC component. At step 510, the method 500 may include heat treating the coated CMC component. At step 512, the method 500 may include grinding the coated CMC component. At step 514, the method 500 may include honing the coated CMC component. At step 516, the method 500 may include extrude honing the coated CMC component. At step 518, the method 500 may include polishing the coated CMC component. In some embodiments, other steps may be performed. In some embodiments, one or more of steps 502 through 518 may be omitted. In some embodiments, one or more of steps 502 through 518 may be performed in a different order that what is illustrated in FIG. 5.

Coatings and/or sealants of the embodiments disclosed herein may be disposed at each of the locations discussed above in which a CMC surface and/or component defines a flow-path boundary and/or defines an interfacing surface with an adjacent component (i.e., thereby forming a seal). Stated otherwise, it may be desirable to dispose the coating of the present embodiments on any CMC boundary and/or interfacing surface on which an enhanced seal and/or improved surface finish is desired. The surfaces on which the coatings may be disposed may include one or more of the transition piece 52, the combustor liners 54, the first stage nozzle 56, the second stage nozzle 58, other turbine nozzles 34, flow-path ducts 60, one or more slash faces 64, one or more shroud segment forward edges 68, one or more shroud segment aft edges 66, one or more shroud hot gas surfaces 76, a platform forward edge 72, a platform aft edge 70, a platform circumferential edge 74, as well as on other seal surfaces of CMC components.

Each of the coatings according to the embodiments disclosed herein may include other oxides other than those listed above. For example, boron oxide may include boron dioxide, boron trioxide, boron monoxide, and/or boron suboxide. Similarly, aluminum oxide may include aluminum (I) oxide, aluminum (II) oxide, and/or aluminum (III) oxide. Each of the coatings according to the embodiments disclosed herein may include a glassy surface that remains smooth in operation. By contrast, other conventional EBCs (environmental barrier coating) and/or TBCs (thermal barrier coatings) may be brittle and may chip away over time, when exposed to gas turbine internal operating temperatures. Each of the coatings according to the embodiments disclosed herein may include a CTE (coefficient of thermal expansion) that is substantially similar to that of the CMC substrate on which they are disposed. For example, in some embodiments, the CTE of the coatings disclosed herein are within about 50% of the CTE of the CMC substrate on which they are disposed. In other embodiments, the CTE of the coatings disclosed herein are within about 20% of the CTE of the CMC substrate on which they are disposed. In other embodiments, the CTE of the coatings disclosed herein are within about 10% of the CTE of the CMC substrate on which they are disposed. In other embodiments, both the coatings disclosed herein as well as the CMC substrate on which they are disposed include a CTE that is equal to or less than about $8.0 \ (\times 10^{-6}/(° \text{C.}))$. With conventional coatings, undulations may form on seal surfaces which may allow undesired leakages to flow past. By including a CTE that approximately matches the CMC substrate on which they are disposed, by including a high softening temperature, and by remaining smooth when exposed to internal gas turbine operating temperatures, the coatings disclosed herein may provide a smooth sealing surface substantially free from undulations, thereby resulting in enhanced sealing. Stated otherwise, the coatings disclosed herein may prevent mating and/or interfacing CMC seal surfaces from developing undulations and/or gaps, which may lead to increases in undesired leakage flows.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A ceramic matrix composite (CMC) component comprising:
   at least one seal surface, the at least one seal surface disposed adjacent an interfacing surface for providing a seal therebetween; and
   a coating disposed on the at least one seal surface, wherein the coating comprises an aluminum oxide, a silicon dioxide, and at least 10% by mass of yttrium oxide, wherein the coating comprises by mass at least 10% of the aluminum oxide and at least 50% of the silicon dioxide.

2. The ceramic matrix composite (CMC) component of claim 1, wherein the coating comprises a surface finish with a roughness average between about 10 microinches and about 150 microinches.

3. The ceramic matrix composite (CMC) component of claim 1, wherein the coating comprises a softening point greater than about 1200° C.

4. The ceramic matrix composite (CMC) component of claim 1, wherein the coating comprises a coefficient of thermal expansion equal to or less than about 8.0 ($\times 10^{-6}$/(° C.)).

5. The ceramic matrix composite (CMC) component of claim 1, wherein the CMC component further comprises a coefficient of thermal expansion equal to or less than about 8.0 ($\times 10^{-6}$/(° C.)).

6. The ceramic matrix composite (CMC) component of claim 1, wherein the CMC component further comprises a coefficient of thermal expansion that is within about 50% of a coefficient of thermal expansion of the coating.

7. The ceramic matrix composite (CMC) component of claim 6, wherein the CMC component further comprises a coefficient of thermal expansion that is within about 20% of a coefficient of thermal expansion of the coating.

8. The ceramic matrix composite (CMC) component of claim 1, wherein the coating comprises by mass at least 15% yttrium oxide.

9. The ceramic matrix composite (CMC) component of claim 1, wherein the coating further comprises barium oxide.

10. The CMC component of claim 8, wherein the coating comprises by mass about 20% yttrium oxide.

11. The CMC component of claim 1, wherein the coating comprises by mass:
    from about 12% to about 22% of the aluminum oxide;
    from about 51% to about 63% of the silicon dioxide; and
    from about 14% to about 28% yttrium oxide.

12. The CMC component of claim 11, wherein the coating further comprises barium oxide.

13. The CMC component of claim 12, wherein the coating further comprises by mass from about 3% to about 7% barium oxide.

14. The CMC component of claim 1, wherein the aluminum oxide and the silicon dioxide are each included in:
    a first material system including by mass from about 50% to about 59% of the silicon dioxide, from about 13% to about 23% of the aluminum oxide, and from about 22% to about 33% yttrium oxide, and
    a second material system including by mass from about 10% to about 18% of the aluminum oxide, from about 61% to about 72% of the silicon dioxide, and further including from about 15% to about 25% barium oxide.

15. The CMC component of claim 14, wherein the coating comprises the first material system in a range of from about 65% to about 85% and the second material system in a range of from about 15% to about 35%.

16. The CMC component of claim 15, wherein the coating comprises by mass about 70% of the first material system and about 30% of the second material system.

17. The CMC component of claim 15, wherein the coating comprises by mass about 80% of the first material system and about 20% of the second material system.

18. A gas turbine comprising:
    a compressor section;
    a combustor section fluidly coupled downstream of the compressor section;
    a turbine section fluidly coupled downstream of the combustor section; and
    a ceramic matrix composite (CMC) component, the CMC component comprising:
        at least one seal surface, the at least one seal surface disposed adjacent an interfacing surface for providing a seal therebetween; and
        a coating disposed on the at least one seal surface, wherein the coating comprises an aluminum oxide and a silicon dioxide each included in:
            a first material system including by mass from about 49% to about 59% of the silicon dioxide, from about 13% to about 23% of the aluminum oxide, and at least 20% yttrium oxide; and
            a second material system including by mass from about 8% to about 18% of the aluminum oxide, from about 61% to about 72% of the silicon dioxide, and at least 15% barium oxide.

19. The gas turbine of claim 18, wherein the ceramic matrix composite (CMC) component is a component of the hot section of the gas turbine.

20. The gas turbine of claim 18, wherein the at least one surface of the ceramic matrix composite (CMC) component is at least one of a transition piece, a combustor liner, a first stage turbine nozzle, a second stage turbine nozzle, a flowpath duct, a shroud slash face, a shroud segment forward edge, a shroud segment aft edge, a shroud hot gas surface, an airfoil platform forward edge, an airfoil platform aft edge, and an airfoil platform circumferential edge.

21. The gas turbine of claim 18, wherein the second material system includes by mass about 20% barium oxide.

22. The gas turbine of claim 18, wherein the first material system includes about 28% yttrium oxide.

\* \* \* \* \*